US009495812B2

(12) United States Patent
Schroeder et al.

(10) Patent No.: US 9,495,812 B2
(45) Date of Patent: Nov. 15, 2016

(54) CALIBRATING ELECTRONIC MODULES OF A VEHICLE USING A CONFIGURATION APPLICATION

(71) Applicant: GM GLOBAL TECHNOLOGY OPERATIONS LLC, Detroit, MI (US)

(72) Inventors: Jamison C. Schroeder, Birmingham, MI (US); Alex Szmatula, Livonia, MI (US); Scott A. Rush, Plymouth, MI (US); Brian V. Sychta, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/643,698

(22) Filed: Mar. 10, 2015

(65) Prior Publication Data

US 2016/0267722 A1 Sep. 15, 2016

(51) Int. Cl.
*G01M 17/00* (2006.01)
*G07C 5/00* (2006.01)

(52) U.S. Cl.
CPC .................................... *G07C 5/008* (2013.01)

(58) Field of Classification Search
None
See application file for complete search history.

(56) References Cited

U.S. PATENT DOCUMENTS

| | | | | |
|---|---|---|---|---|
| 2006/0208169 A1* | 9/2006 | Breed | .................... | B60N 2/002 250/221 |
| 2014/0306799 A1* | 10/2014 | Ricci | ........................ | B60Q 1/00 340/5.83 |
| 2014/0310186 A1* | 10/2014 | Ricci | ..................... | H04W 48/04 705/302 |

* cited by examiner

*Primary Examiner* — Adam Alharbi
(74) *Attorney, Agent, or Firm* — Leydig, Voit & Mayer Ltd.

(57) ABSTRACT

A system is provided for calibration of vehicle electronic modules. The system includes: a vehicle and a computing device separate from the vehicle. The vehicle includes: a vehicle communications interface, configured to facilitate communications with a computing device without utilizing an Assembly Line Diagnostic Link (ALDL) or on-board diagnostic (OBD) port; and a plurality of electronic modules, the plurality of electronic modules being configurable via calibration data received via the vehicle communications interface. The computing device includes: a computing device communications interface, configured to facilitate communications with the plurality of electronic modules of the vehicle via the vehicle communications interface; a human machine interface (HMI), configured to receive input from a user and to display information; and a processor, configured to execute a calibration application, the calibration application being configured to utilize the HMI of the computing device to receive input from the user, and further being configured to generate calibration data corresponding to the user input for transmission to respective vehicle electronic modules.

20 Claims, 3 Drawing Sheets

CALIBRATING ELECTRONIC MODULES OF A VEHICLE USING A CONFIGURATION APPLICATION

BACKGROUND

Mobile vehicles, such as automobiles, generally comprise a plurality of electronic modules for providing various different aspects of functionality for each vehicle. Vehicle development and assembly includes programming these electronic modules with appropriate calibration data, and modifying the calibration data is often needed as part of various development and validation processes.

In conventional development and validation processes, the calibration data of vehicle electronic modules is modified using an Assembly Line Diagnostic Link (ALDL) interface or other type of on-board diagnostic (OBD) port interface. In order to utilize such ALDL or OBD interfaces for manipulation of calibration data, complicated configuration toolchains and specialized equipment are needed—for example, CALDS, Neovi, and DSPTool archives—along with technicians having specific knowledge and experience with such configuration tools.

SUMMARY

Implementation of the invention provide systems and processes by which vehicle electronic modules are able to be calibrated using a calibration application accessible through an in-vehicle human-machine interface (HMI) such as a touchscreen within the vehicle, or remotely through an HMI of a remote computing device, such as a personal computer, laptop, tablet, or smartphone.

In an exemplary implementation, the invention provides a system for calibration of vehicle electronic modules. The system includes: a vehicle and a computing device separate from the vehicle. The vehicle includes: a vehicle communications interface, configured to facilitate communications with a computing device without utilizing an Assembly Line Diagnostic Link (ALDL) or on-board diagnostic (OBD) port; and a plurality of electronic modules, the plurality of electronic modules being configurable via calibration data received via the vehicle communications interface. The computing device includes: a computing device communications interface, configured to facilitate communications with the plurality of electronic modules of the vehicle via the vehicle communications interface; a human machine interface (HMI), configured to receive input from a user and to display information; and a processor, configured to execute a calibration application, the calibration application being configured to utilize the HMI of the computing device to receive input from the user, and further being configured to generate calibration data corresponding to the user input for transmission to respective vehicle electronic modules.

In another exemplary implementation, the invention provides a system within a vehicle for calibration of electronic modules of a vehicle using a human-machine interface (HMI) of the vehicle. The system includes: a human machine interface (HMI), configured to receive input from a user and to display information; and a plurality of electronic modules, the plurality of electronic modules being configurable via calibration data received from a calibration application installed at the vehicle; and a processor, configured to execute the calibration application, the calibration application being configured to utilize the HMI of the vehicle to receive input from the user, and further being configured to generate calibration data corresponding to the user input for transmission to respective vehicle electronic modules.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

An exemplary computing and network communications environment involving a telematics-equipped vehicle is described with reference to FIG. 1. It will be appreciated that the described environment is an example, and does not imply any limitation regarding the use of other environments to practice the invention.

Figure 1:
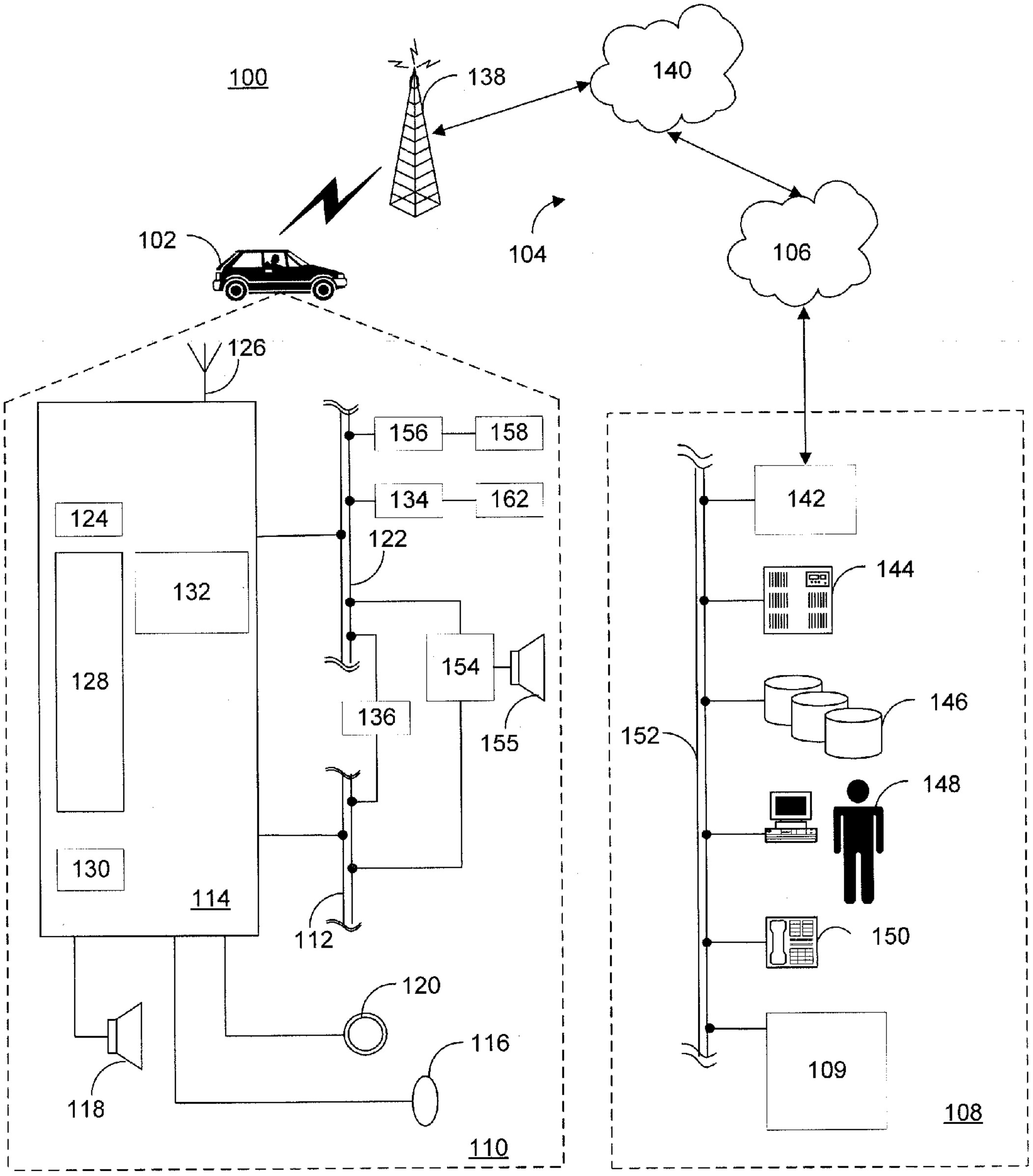
FIG. 1 is a schematic diagram of an operating environment for a mobile vehicle communication system usable in exemplary implementations of the described principles.

FIG. 1 depicts an exemplary communication system 100 that may be used with exemplary implementations of the invention, the communication system 100 including a vehicle 102, a mobile wireless network system 104, a land network 106 and a communications center 108. It should be appreciated that the overall architecture, setup and operation, as well as the individual components of the communication system 100 are generally known in the art. In accordance with an illustrative example, the communication center 108 includes a Global Navigation Satellite System (GNSS) control center 109 incorporating functional components facilitating over-the-air configuration of GNSS receivers integrated with/within telematics units such as a telematics unit 114.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via wireless communications (e.g., over a cellular wireless network). The vehicle 102 includes hardware 110 such as, for example, the telematics unit 114, a microphone 116, a speaker(s) 118 and buttons and/or controls 120, which may be integrated with or separate from the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), a local area network (LAN), an Ethernet, and other appropriate connections such as those that conform with known ISO, SAE, and IEEE standards and specifications.

The telematics unit 114 provides a variety of telematics-related services through communications with the communications center 108 (or "call center"). The telematics unit 114 includes a processor 128, memory 130, a mobile wireless component 124 including a mobile wireless chipset, a dual function antenna 126 (both GNSS and mobile wireless signals), and a GNSS component 132 including a GNSS chipset. The memory 130 comprises computer program(s) and/or set(s) of computer-executable instruction sets/routines that are transferred to, and executed by, the processing device 128. In one example, the mobile wireless component 124 comprises an additional memory having stored thereon other computer program(s) and/or set(s) of computer-executable instruction sets/routines that are executed by the processing device 128. The mobile wireless component 124 constitutes a network access device (NAD) of the telematics unit 114.

The telematics-related services may also be provided via the communications center 108 in combination with applications executed on a mobile device, such as a smartphone, or, alternatively, via communications between the telematics unit 114 and a mobile device that do not involve the communications center 108.

The telematics-related services include an extensive and extendable set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. For example, other service include but are not limited to: vehicle door unlocking, diagnostic monitoring, firmware/software updating, emergency or theft-related services, etc. Moreover, the telematics unit 114 may include a number of known components in addition to those explicitly described above.

The telematics unit 114 may establish a communications channel with the mobile wireless network system 104, for example using radio-based transmissions, so that both voice and data signals can be sent and received via the communications channel. In one example, the mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with a way to input verbal or other auditory commands, and can be equipped with an embedded voice processing unit utilizing human/machine interface (HMI) technology. The speaker(s) 118 provides verbal output to the vehicle occupants and can be either a stand-alone speaker specifically dedicated for use with the telematics unit 114 or can be part of an audio component 154. In either case, the microphone 116 and the speaker(s) 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114. In certain implementations, the buttons and/or controls 120 may include a touchscreen which acts both as a display and as an input interface.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of or in combination with the infotainment center 136. The audio component 154 may contain an additional speaker system 155, or may utilize the speaker(s) 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The wireless network system 104 is, for example, a cellular telephone network system or any other suitable wireless system that transmits signals between mobile wireless devices, such as the telematics unit 114 of the vehicle 102, and may further include land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSCs 140 may include remote data servers.

As appreciated by those skilled in the art, the mobile wireless network system includes various cell tower/base station/MSC arrangements. For example, a base station and a cell tower could be located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, wireless networks such as wireless local networks (WLANs) or networks providing broadband wireless access (BWA), or any combination thereof.

The communications center 108 is configured to provide a variety of back-end services and application functionality relating to the vehicle hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which may be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by computing devices (such as the telematics unit, communications center equipment, and other computing devices) may be carried out according to stored instructions and/or applications installed thereon.

Figure 2:
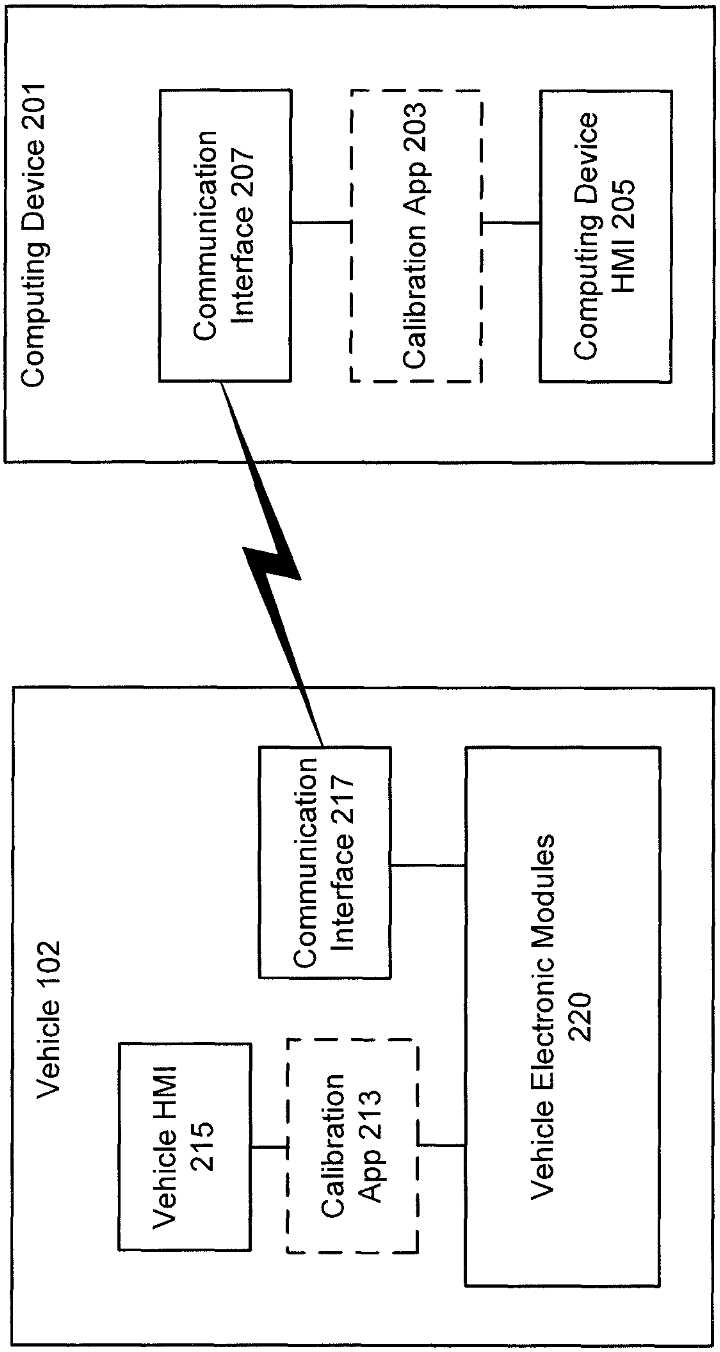
FIG. 2 is a simplified schematic diagram of an operating environment usable in exemplary implementations of the described principles utilizing a calibration application with an in-vehicle HMI and/or a remote computing device HMI.

FIG. 2 is a block diagram illustrating different implementations of the invention with reference to the exemplary environment of FIG. 1. In one exemplary implementation, a calibration application 213 is provided at the vehicle 102—for example, the calibration application 213 is installed on a memory of the telematics unit 114 and is executed by a processor of the telematics unit 114, and the calibration application 213 utilizes a vehicle HMI 215 (such as a touchscreen display and/or a conventional display in conjunction with buttons) to interface with a user. The calibration application 213 also communicates with vehicle electronic modules 220 along appropriate connections within the vehicle 102 (e.g., including vehicle bus 122).

In another exemplary implementation, a calibration application 203 is provided at a remote computing device 201, which may be, for example, a personal computer, laptop, tablet, smartphone, or other computing device. The calibration application 203 utilizes a computing device HMI 205 (e.g., touchscreen, keyboard and mouse with display, etc.) to interface with a user, and the calibration application 203 utilizes communication interface 207 (e.g., a transceiver such as a cellular transceiver or Bluetooth transceiver, a Universal Serial Bus (USB) interface, etc.) of the computing device 201 to communicate with vehicle electronic modules 220 via a communication pathway that includes a communication interface 217 of the vehicle 102 (e.g., a transceiver such as the NAD 124 or a Bluetooth transceiver, a USB interface, etc.).

In other exemplary implementations, both the calibration application 203 at the computing device 201 and the calibration application 213 of the vehicle 102 are utilized together, and the two applications interact with one another to facilitate development and validation processes for the vehicle electronic modules 220. In this example, calibration data provided from a remote computing device 201 over the network 104 may be further processed by the calibration application 213 at the vehicle 102. For example, a general calibration-related command sent to the vehicle 102 may be converted to a specific calibration-related command adapted particularly for a specific vehicle electronic module configuration of the vehicle 102. In another example, the calibration application 213 provides an in-vehicle user the opportunity to confirm whether a remote command from computing device 201 is to be executed or not via the vehicle HMI 215.

The calibration application according to implementations of the invention (whether in-vehicle or at a remote computing device or some combination thereof) provide for an efficient, cost-effective and user-friendly way in which users can perform development and validation processes for electronic modules of a vehicle. The calibration application provides a direct interface for the user into controllers embedded within the vehicle that previously would have only been accessible via an ALDL or OBD port. Thus, using these implementations of the invention, the difficulties and expenses associated with performing development and validation through specially trained personnel using complex toolchains can be avoided.

In different implementations of the invention, the calibration application communicates with the electronic vehicle modules in different ways. In one exemplary vehicle architecture, where each vehicle electronic module has its own controller associated therewith, the calibration application is configured with appropriate programming to allow the calibration application to communicate with each of the different controllers according to suitable communication protocols. For example, the calibration application may use an application programming interface (API) to communicate with host, gateway or master modules, and use serial data payload delivery to communicate with conventional electronic interfaces (in some cases, serial data payload delivery may be used to communicate with the host, gateway or master modules via APIs as well).

In another exemplary implementation, the calibration application utilizes conventional physical messaging protocols (e.g., according to standard CAN protocols) between vehicle modules and adapts the content of the physical messaging protocols for testing purposes. For example, the calibration application uses binary download and boot code processing to cause an electronic control unit of a first vehicle module to send physical messages to a second vehicle module (i.e., a target module to be calibrated or configured) via a CAN communication pathway. In this example, the calibration application controls the first vehicle module to serve as a service programming device for the second vehicle module via diagnostic CAN communication pathways that are conventionally present in a vehicle.

In another exemplary implementation, the calibration application uses functional messaging between various points of the vehicle's internal network of modules. By modifying the data payloads of such messages, the calibration application is able to send commands and data requests to various modules without requiring the modules to change their serial databases. The use of functional messaging further allows for flexibility for the content of the commands/data requests, as functional messaging is able to use a multi-frame transport protocol that is not constrained like the conventional physical messaging protocols used with traditional service tools and the CAN standards. Thus, while physical messaging communication pathways can still be utilized for the sending of the functional messages, relatively longer and more sophisticated messages can be sent via those pathways. Since different vehicle electronic modules have different numbers of calibration partitions, different programming complexity, etc., the use of functional messaging with a multi-frame transport protocol provides the calibration application with the capability of specifically configuring or calibrating a particular vehicle electronic module based on the specific characteristics of that particular vehicle electronic module using point-to-point messaging.

According to any of the foregoing described manners of communication, the calibration application provides a conduit that a user may use to efficiently and cost-effectively perform validation and development processes with respect to a variety of different vehicle electronic modules. An exemplary process may include the calibration application sending a request to one or more of the electronic vehicle modules for current configuration information (e.g., status of one or more calibration parameters), which, for example, may be accomplished by sending of a physical message to an electronic control unit of a vehicle module requesting such information. Then, the calibration application determines whether any calibration parameters need to be changed, for example, by communicating with a telematics service provider or other external network source. If the determination is made to change one or more calibration parameters, the calibration application then sends a message to the corresponding vehicle electronic module via one or more of the communication pathways discussed above.

Figure 3:
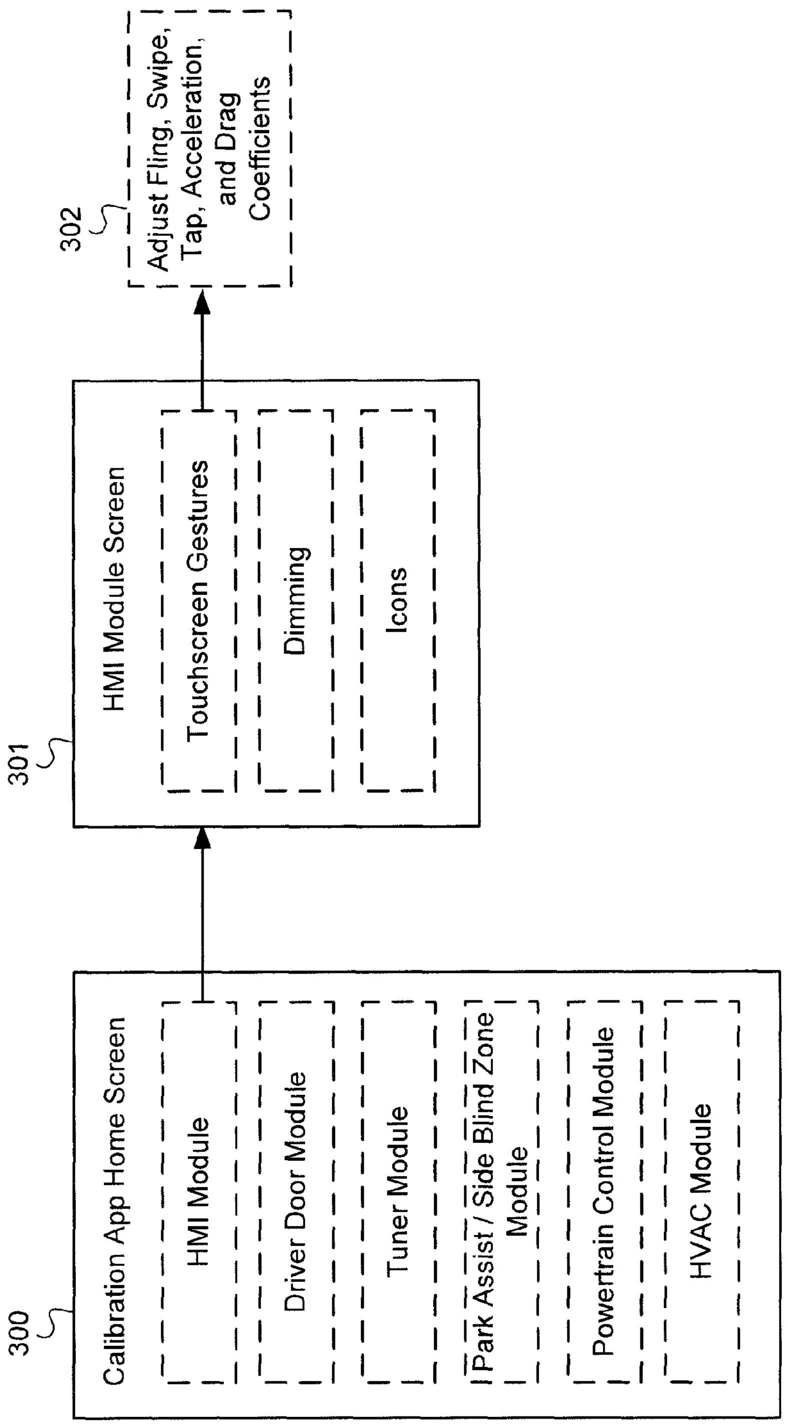
FIG. 3 is a flowchart illustrating exemplary configuration options for vehicle electronic modules using a calibration application in exemplary implementations of the described principles.

FIG. 3 is a flowchart illustrating exemplary screens of a calibration application corresponding to an exemplary configuration option. Stage 300 of FIG. 3 corresponds to a home screen for the calibration application, including options to configure various modules, including, for example, an HMI module, a driver door module, a tuner module, a park assist/side blind zone module, a powertrain control module, and a Heating, Ventilation and Air Conditioning (HVAC) module. Stage 301 corresponds to an HMI module screen, which is displayed to a user of the calibration application in response to the user selecting the HMI module from the home screen. The HMI module screen includes options to configure various features corresponding to the HMI, for example, touchscreen gestures, dimming, and displayed icons. In response to a user selecting the touchscreen gestures option, the calibration app further presents the user with various configuration options specifically pertaining to calibration of fling, swipe, tap, acceleration, and drag coefficients at stage 302. It will be appreciated that the depicted lists are merely exemplary, and that other features and modules may be configured using a calibration application as well.

In an alternate example, if a user of the calibration application had chosen to calibrate the icons of the vehicle HMI via the HMI module screen presented at stage 301, the user may be presented with the option to select an icon to be calibrated (e.g., a weather icon, a traffic icon, a text messaging icon, a voice call icon, etc.). Then, using the calibration application, the user is able to select an option to toggle the icon on or off for the vehicle HMI, and the calibration application generates appropriate corresponding calibration data to configure the vehicle HMI accordingly. The process may further include the user choosing an option to begin calibration processing for the icon and to end calibration processing for the icon.

Table 1 is provided below to further illustrate certain exemplary vehicle modules, the features and parameters corresponding thereto that may be calibrated, as well as the communication pathways involved in such calibrations.

TABLE 1

| Module | Feature | Parameter/Value | Exemplary Communication Pathway(s) |
|---|---|---|---|
| HMI | Touchscreen gestures | Fling, swipe, tap, acceleration and drag coefficients | App -> HMI module |
| HMI | Dimming of display to match vehicle dimming | Calibration table for screen intensity based on vehicle dimming | App -> HMI module |
| Driver Door | Dimming of door switch to match vehicle dimming | Calibration table for switch backlighting intensity | App -> HMI module; HMI -> Tuner module via MOST (serial); Tuner Module -> Body Computer module (BCM) via CAN/LAN (serial); BCM -> Driver Door module via LIN or CAN/LAN (serial) |

TABLE 1-continued

| Module | Feature | Parameter/Value | Exemplary Communication Pathway(s) |
| --- | --- | --- | --- |
| Tuner | Antenna reception performance | AM/FM tuning coefficients; HD radio tuning coefficients; XM radio tuning coefficients | App -> HMI module; HMI module -> Tuner module via MOST (serial) |
| Park Assist/ Side Blind Zone (may be part of HMI) | Front, rear and side camera images; driver assistance overlays | Pixel position of overlay for parking aid based on vehicle variations and camera mounting | App -> HMI module; HMI module -> Tuner module via MOST (serial); Tuner module -> Park Assist/ Side Blind Zone module via CAN/LAN (serial) |
| Power-train Control | Transmission gear shift performance | 2D or 3D calibration tables relating to transmission shift performance | App -> HMI module; HMI module -> Powertrain Control module via CAN/LAN (serial) |
| HVAC | Fan blower motor speed; HOT/COLD blending performance | Temperature tables; servo motor set points | App -> HMI module; HMI module -> Tuner module via MOST (serial); Tuner module -> HVAC module via CAN/LAN (serial) |
| Any module supporting diagnostic trouble codes (DTCs) | Diagnostic service code performance | X out of Y thresholds; timer thresholds before activating DTCs | App -> any module supporting DTCs along appropriate pathways |
| host, gateway or master modules | Any features of the respective host, gateway or master module | Any parameters/ values corresponding to the features of the respective host, gateway or master module | App -> host, gateway or master module using application programming interface (API) (may include communications involving serial buses) |

As can be seen from Table 1, certain calibration data sent by the calibration application and received via the telematics unit of the vehicle is directly communicated to the corresponding module without the need for any serial data bus and without involving other modules, while other communications between the calibration application and vehicle modules involve one or more serial data buses and one or more other modules. For example, in the exemplary implementation depicted in FIG. 3, the calibration application sends a configuration-related command to the HMI module which is ultimately intended for the HVAC module, and the HMI module passes it along to the HVAC module via the Tuner module using module-to-module serial data bus-based broadcast-type communications (e.g., the HMI module sends a MOST message to the Tuner module and the Tuner module sends a CAN/LAN message to the HVAC module). Because the calibration application is able to communicate with vehicle modules directly, as well as via module-to-module serial data bus-based broadcast-type communications, the calibration application is highly scalable and is able to be adapted to various module configurations and various module types.

Further, for host, gateway or master modules (such as for various vehicle tuning applications including, for example, chimes, click clacks, initial phone volumes, mode balancing, vehicle speed volume compensation, etc.), the vehicle electronic modules communicate with the calibration application via application programming interfaces (APIs) to efficiently and cost-effectively provide various calibration functionality to a user via the calibration application.

The features of a vehicle that are configurable by the calibration application, such as those depicted in FIG. 3 and Table 1, have various appropriate development and validation processes that may be performed by a user using the calibration application. Additionally, it is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for calibration of vehicle electronic modules, the system comprising:

a vehicle, comprising:

a vehicle communications interface, configured to facilitate communication of calibration data with a computing device without utilizing an Assembly Line Diagnostic Link (ALDL) or on-board diagnostic (OBD) port; and a plurality of electronic modules, the plurality of electronic modules being configurable via the calibration data received via the vehicle communications interface; and the computing device, separate from the vehicle, comprising:

a computing device communications interface, configured to facilitate communication of the calibration data with the plurality of electronic modules of the vehicle via the vehicle communications interface;

a human machine interface (HMI), configured to receive input from a user and to display information; and a processor, configured to execute a calibration application, the calibration application being configured to utilize the HMI of the computing device to receive input from the user, and further being configured to generate the calibration data for transmission to respective vehicle electronic modules;

wherein the plurality of electronic modules includes a vehicle HMI module, the vehicle HMI module being configured to control an in-vehicle touchscreen display;

wherein the calibration data includes data for configuring the vehicle HMI module with respect to displaying icons on the in-vehicle touchscreen display; and wherein, based on the execution of the calibration application by the processor of the computing device and transmission of the data for configuring the vehicle HMI module to the vehicle HMI module, the computing device is configured to modify the configuration of the HMI module so as to modify the manner in which icons are displayed on the in-vehicle touchscreen display.

2. The system according to claim 1, wherein the vehicle communications interface is part of a telematics unit of the vehicle.

3. The system according to claim 1, wherein the computing device is a smartphone or tablet.

4. The system according to claim 1, wherein the plurality of electronic modules includes a host, gateway or master module, and the calibration application communicates with the host, gateway or master module via an application programming interface (API).

5. The system according to claim 1, wherein the system is configured such that the calibration data is communicated to the plurality of electronic modules via a physical messaging protocol.

6. The system according to claim 5, wherein the communication of the calibration data to the plurality of electronic modules further utilizes a multi-frame transport protocol.

7. The system according to claim 1, wherein the plurality of electronic modules further include a driver door module, a tuner module, a powertrain control module, and a heating, ventilation and air conditioning (HVAC) module.

8. A system within a vehicle for calibration of electronic modules of a vehicle using a human-machine interface (HMI) of the vehicle, the system comprising:

an in-vehicle touchscreen display, configured to receive input from a user and to display information; and a plurality of electronic modules, the plurality of electronic modules being configurable via calibration data received from a calibration application installed at the vehicle; and a processor, configured to execute the calibration application, the calibration application being configured to utilize the in-vehicle touchscreen display to receive input from the user, and further being configured to generate calibration data corresponding to the user input for transmission to respective vehicle electronic modules without utilizing an Assembly Line Diagnostic Link (ALDL) or on-board diagnostic (OBD) port;

wherein the plurality of electronic modules includes a vehicle HMI module, the vehicle HMI module being configured to control an in-vehicle touchscreen display;

wherein the calibration data includes data for configuring the vehicle HMI module with respect to displaying icons on the in-vehicle touchscreen display; and wherein, based on the execution of the calibration application, the processor is configured to modify the configuration of the HMI module so as to modify the manner in which icons are displayed on the in-vehicle touchscreen display.

9. The system according to claim 8, wherein the processor is part of a telematics unit of the vehicle.

10. The system according to claim 8, wherein the system is configured such that the calibration data is communicated to the plurality of electronic modules via a physical messaging protocol.

11. The system according to claim 10, wherein the communication of the calibration data to the plurality of electronic modules further utilizes a multi-frame transport protocol.

12. The system according to claim 8, wherein the plurality of electronic modules includes a host, gateway or master module, and the calibration application communicates with the host, gateway or master module via an application programming interface (API).

13. The system according to claim 8, wherein the plurality of electronic modules further include a driver door module, a tuner module, a powertrain control module, and a heating, ventilation and air conditioning (HVAC) module.

14. A system for calibration of vehicle electronic modules, the system comprising:

a vehicle, comprising:

a vehicle communications interface, configured to facilitate communication of calibration data with a computing device without utilizing an Assembly Line Diagnostic Link (ALDL) or on-board diagnostic (OBD) port;

a plurality of electronic modules, the plurality of electronic modules being configurable via the calibration data received via the vehicle communications interface; and a first processor, configured to execute a first calibration application, the first calibration application being configured to interact with a second calibration application for generation and transmission of the calibration data to respective vehicle electronic modules;

the computing device, separate from the vehicle, comprising:

a computing device communications interface, configured to facilitate communication of calibration data with the plurality of electronic modules of the vehicle via the vehicle communications interface;

a human machine interface (HMI), configured to receive input from a user and to display information; and a second processor, configured to execute the second calibration application, the second calibration application being configured to utilize the HMI of the computing device to receive input from the user, and further being configured to interact with the first calibration application for generation and transmission of the calibration data to respective vehicle electronic modules;

wherein the plurality of electronic modules includes a vehicle HMI module, the vehicle HMI module being configured to control an in-vehicle touchscreen display;

wherein the calibration data includes data for configuring the vehicle HMI module with respect to displaying icons on the in-vehicle touchscreen display; and wherein, based on the execution of the first and second calibration applications, the first and second processors are configured to modify the configuration of the module so as to modify the manner in which icons are displayed on the in-vehicle touchscreen display.

15. The system according to claim 14, wherein the vehicle communications interface is part of a telematics unit of the vehicle.

16. The system according to claim 14, wherein the computing device is a smartphone or tablet.

17. The system according to claim 14, wherein the plurality of electronic modules includes a host, gateway or master module, and the calibration application communicates with the host, gateway or master module via an application programming interface (API).

18. The system according to claim 14, wherein the system is configured such that the calibration data is communicated to the plurality of electronic modules via a physical messaging protocol.

19. The system according to claim 5, wherein the communication of the calibration data to the plurality of electronic, modules further utilizes a multi-frame transport protocol.

20. The system according to claim 1, wherein the plurality of electronic modules further include a driver door module, a tuner module, a powertrain control module, and a heating, ventilation and air conditioning (HVAC) module.

* * * * *